Aug. 27, 1968    A. G. BOLDRIDGE, JR    3,399,292
HEATED PRESSURE ROLLER
Filed Dec. 2, 1965

# United States Patent Office 3,399,292
Patented Aug. 27, 1968

3,399,292
HEATED PRESSURE ROLLER
Austin G. Boldridge, Jr., Ridgewood, N.J., assignor to Metal Skin Process Corp., Fairfield, N.J., a corporation of New Jersey
Filed Dec. 2, 1965, Ser. No. 511,192
4 Claims. (Cl. 219—469)

ABSTRACT OF THE DISCLOSURE

A heated pressure roller having an outer surface, there being a continuous spiral groove extending inwardly from said outer surface a depth sufficient to completely accommodate a heating element, and a thin synthetic resinous sleeve covering said outer surface and in direct proximity with the heating element.

---

This invention relates generally to the field of pressure rollers of types normally used to laminate sheet or planar material, and more particularly, to an improved form thereof adapted for use at relatively high temperatures in laminating thermoplastic materials, wherein the material is softened during application. Reference is made to U.S. Patent No. 3,054,708, granted Sept. 18, 1962, to David J. Steinberg entitled, Protection of Polished Metallic Surfaces which discloses one application to which the invention herein is ideally suited.

In Patent No. 3,054,708, there is disclosed a technique for applying synthetic resinous material to a polished metallic surface, by means of a static charge imparted to the synthetic resinous material. While this technique has proven very satisfactory where the surface to which the protective synthetic resinous material is applied is quite smooth, it has been found that to achieve a good bond with materials having finished surfaces which are other than entirely smooth, heat is necessary to soften the material in order that it may flow into the declivities in the finished surface, whereby air and other foreign material may be moved aside with application of the synthetic resinous material. Obviously, the presence of any air trapped between the protective material and the finished surface will prevent the obtaining of a suitable bond. This is equally true of any foreign material such as moisture, which can be readily vaporized with the application of heat. By softening the synthetic resinous film at the time of application, it can readily flow into the ridges and grooves with the concurrent application of sufficient pressure.

The principal problem in forming a roller capable of accomplishing the above end lies in the difficulty in keeping the heat at the surface of the roller at a reasonably constant level. Since excess heat will melt the film, the inadequate heat will not cause a proper bond, the range of usable temperatures is relatively narrow. As a practical matter, it is not possible to maintain this range without having the heating means disposed at or near the operative surface of the roller. Various solutions have been attempted with only limited success. The use of conductive rubber in this field is well known, but such use is extremely dangerous because of the conductivity involved. Also known in the art are woven resistance wire blankets which tend to collapse under pressure with relatively limited use.

It is, therefore, among the principal objects of the invention to provide an improved heated roller in which the heating elements are disposed beneath the operative surface of the roller so as to be protected from pressure as the roller applies the film to the surface to be protected.

Another object of the invention lies in the provision of an improved heated pressure roller in which the heating elements are disposed near the external surfaces thereof, whereby heat transfer is immediate and capable of accurate control.

Yet another object of the invention lies in the provision of an improved heated roller which may be substantially completely encased in a suitable high temperature flexible synthetic resinous material, such as silicone rubber which will permit the application of heat with accompanying resilient pressure, whereby minor irregularities in the material or the surface to be protected may be conveniently accommodated.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

Figure 1:
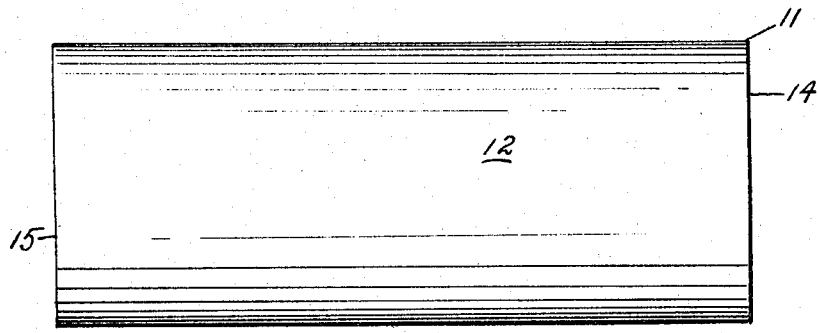
FIGURE 1 is a view in elevation showing a metallic sleeve or core forming a part of the disclosed embodiment.
Figure 1A:
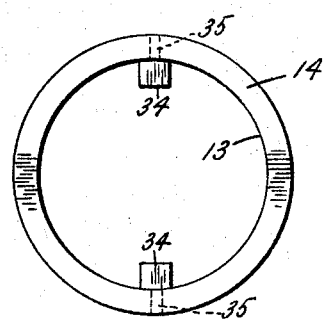
FIGURE 1a is an end elevational view thereof.

In accordance with the invention, there is shown in FIGURE 1 of the drawing a hollow cylinder 11, which may be most conveniently formed from a length of steel tubing, to be subsequently machined as described hereinbelow. The cylinder 11 is bounded by a smooth outer cylindrical surface 12, and an inner cylindrical surface 13, as well as end portions 14 and 15 (see FIG. 1a).

Figure 2:
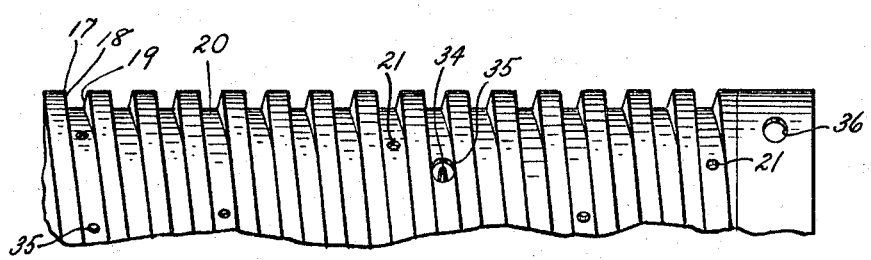
FIGURE 2 is an enlarged fragmentary view in elevation showing a first stage of formation of a completed roller.

As seen in FIG. 2, as a first step in the manufacture of the device, at least one continuous groove 17 is machined into the outer surface 12, the groove 17 having a generally rectangular cross-section bounded by side surfaces 18 and 19 and a bottom surface 20. At the termination of the groove 17 is an opening or openings 36 which allows for the connection of the wire or wires 27 on the inside of the cylinder 11. Extending from the bottom surface 20 to the inner surface 13 at convenient intervals, are a plurality of through openings 21 for the holding in place electrical connecting wires (not shown).

Figure 3:
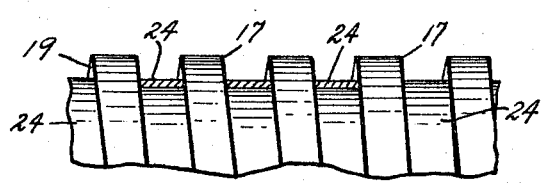
FIGURE 3 is a similar fragmentary view showing the application of a small quantity of synthetic resinous material within externally disposed grooves on the outer surface of the sleeve or core.
Figure 4:
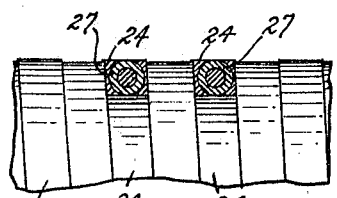
FIGURE 4 is a similar fragmentary view showing the insertion of insulated heating wires into the grooves.

Referring to FIG. 3, after careful cleaning of the groove 17, a layer of suitable, curable, heatsetting, synthetic resinous material is applied within the groove 17 partially fill the same, following which, as seen in FIG. 4, fibre glass coated resistance wire 27 is seated within the layer 24 which is still in flowable condition. If required, additional silicone rubber may be placed upon the now seated wires to completely fill the remaining voids in the groove 17.

Figure 5:
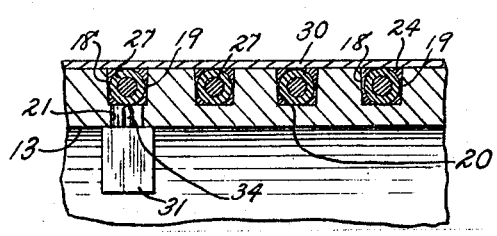
FIGURE 5 is a fragmentary sectional view showing the installation of an outer sleeve of resilient synthetic resinous material upon the outer surface of the core of FIGURE 1 to complete the fabrication of the roller.

Referring to FIG. 5, a sleeve 30 of silicone rubber is pulled over the outer surface 12 to form an envelope completely facing the grooves 17, following which the sleeve 30 and silicone rubber 24 are cured by heating, as is well known in the art.

To maintain accurate operational temperatures, the ends of the wire or wires 27 are connected through openings 35 so as to contact probes on thermistors or thermocouples 34, whereby the temperature of the wire may be directly sensed. The wires are then connected in parallel or series with the usual commutator rings (not shown) well known in the art to provide for passage of current through the cylinder 11 when it is mounted as a roller in fixed bearings (not shown).

It will be observed that owing to the fact that the wire or wires 27 are disposed below the outer surface 12 stress is absorbed by the remaining portions of the outer surface 12, and not transmitted either to the silicone rubber 24 or the wire 27. Thus, with flexing of the sleeve 30, no corresponding flexing of the wire 27 need occur, whereby the metallic core of the same is not crystallized with continued use.

I wish it to be understood that I do not consider the invention limited to the precise details of structure shown and set forth in this specification, for obvious modifications will occur to those skilled in the art to which the invention pertains.

I claim:

1. A heated pressure roller comprising: a length of hollow tubing having inner and outer cylindrical surfaces, there being at least one spiral groove extending into said tubing from the outer surface thereof, said groove forming a plurality of substantially parallel convolutions separated by remaining portions of said outer surface; a wire heating element disposed within said groove, and lying substantially below said outer surface, and a sleeve of resilient material positioned upon and supported by said outer surface nad covering said groove.

2. Structure as set forth in claim 1 in which said wire heating element is surrounded by silicone rubber substantially filling said groove.

3. Structure as set forth in claim 2 in which said sleeve is formed of silicone rubber bounded to the silicone rubber positioned in said groove.

4. Structure as set forth in claim 1, and temperature sensing means for indicating the temperature of said sleeve.

References Cited

UNITED STATES PATENTS

| | | | |
|---|---|---|---|
| 2,526,906 | 10/1950 | Schaab et al. | 219—469 |
| 3,243,579 | 3/1966 | Sussin | 219—469 |
| 3,278,723 | 10/1966 | Van Toorn | 219—470 |

RICHARD M. WOOD, *Primary Examiner.*

L. H. BENDER, *Assistant Examiner.*